(12) United States Patent
Mangone, Jr.

(10) Patent No.: US 10,208,780 B1
(45) Date of Patent: Feb. 19, 2019

(54) LINE MOUNTING DEVICE

(71) Applicant: Peter G. Mangone, Jr., Golden, CO (US)

(72) Inventor: Peter G. Mangone, Jr., Golden, CO (US)

(*) Notice: Subject to any disclaimer, the term of this patent is extended or adjusted under 35 U.S.C. 154(b) by 0 days.

(21) Appl. No.: 15/596,216

(22) Filed: May 16, 2017

(51) Int. Cl.
*F16B 13/06* (2006.01)
*F16B 13/14* (2006.01)
*F16L 3/10* (2006.01)

(52) U.S. Cl.
CPC .......... *F16B 13/063* (2013.01); *F16B 13/14* (2013.01); *F16L 3/10* (2013.01)

(58) Field of Classification Search
CPC ............ F16L 3/10; F16B 13/063; F16B 13/14
See application file for complete search history.

(56) References Cited

U.S. PATENT DOCUMENTS

| | | | | |
|---|---|---|---|---|
| 3,199,816 A * | 8/1965 | Weisz | ............... | F16L 3/1236 248/71 |
| 3,465,992 A * | 9/1969 | Schuplin | ............... | F16L 3/233 248/71 |
| 4,588,152 A * | 5/1986 | Ruehl | ............... | F16B 13/02 248/548 |
| 4,655,423 A * | 4/1987 | Schavilje | ............... | B25B 31/00 227/3 |
| 4,936,530 A * | 6/1990 | Wollar | ............... | F16B 2/12 248/68.1 |
| 5,765,787 A * | 6/1998 | de Beers | ............... | F16L 3/13 248/316.7 |
| 5,921,510 A * | 7/1999 | Benoit | ............... | F16L 3/2334 248/68.1 |
| 6,969,039 B1 * | 11/2005 | Diggle, III | ............... | A63B 27/02 248/216.1 |
| 7,559,511 B2 * | 7/2009 | Yon | ............... | F16L 3/2235 174/135 |
| 9,004,415 B2 * | 4/2015 | Fukumoto | ............... | F16B 19/1081 248/51 |

* cited by examiner

*Primary Examiner* — Anita M King
(74) *Attorney, Agent, or Firm* — Michael Best & Friedrich LLP

(57) ABSTRACT

A mounting device for affixing to a hole or bore in a support structure to anchor a line to the mounting device and support structure including a base with a hole passing through the base, hub extending from the base back surface having a pair of flexible legs and engagement members on the outer surfaces of the legs, a stirrup having a line receiving opening attached to the base front surface, and a locking member with a hook member at its proximal end and a distally extending shaft dimensioned to pass through the hole in the base and enter the distally extending cavity to engage the inner surfaces of the legs and bend them laterally thereby affixing the mounting device in the hole or bore and capturing the line in the stirrup.

28 Claims, 3 Drawing Sheets

LINE MOUNTING DEVICE

FIELD OF THE DISCLOSURE

This disclosure pertains to devices for anchoring lines, which may be cables, ropes, strings, cords, wires, hooks, eyelets and rings to support structures and, more particularly, to a mounting device for attachment in a hole or bore in a support structure such as a hollow or solid wall to anchor lines to the support structure.

BACKGROUND

There are many applications today where it is necessary to rapidly and securely hang or mount lines or other appropriate objects to support structures including support structures having hollow walls or varying types of solid walls. The lines may include cables, ropes, strings, chords, wires. Other lines that may be hung or attached to support structures may include hooks eyelets and rings that are to be received in a mounting device of the type described herein associated with objects that are to be attached to the support structures.

For example, Internet, cable TV and telephone companies dispatch installers throughout the United States and the world to mount many, many cables and wires to a wide variety of support structures every day. The installers must be able to rapidly and securely utilize mounting devices to mount these lines in homes and commercial facilities that have hollow walls and solid walls that vary in density and consistency. The walls may include stucco walls and foam-backed stucco walls.

It is an object of embodiments of this invention to provide mounting devices that can be readily used to anchor lines to support structures comprising many types of hollow walls and solid walls.

It is another object of embodiments of this invention to provide improved mounting devices that can be easily mounted to such support structures without using additional devices such as mortar anchors to precondition the support surface.

It is yet another object of embodiments of this invention to provide such mounting devices in which lines can be firmly attached to support structures when there is no space within or behind the support structure allowing for the utilization of toggle clips.

Another object of embodiments of this invention is to provide mounting devices in which lines can be firmly attached to support structures that are not sufficiently dense to securely and reliably hold nails or screws.

A further object of embodiments of this invention is to provide mounting devices that can be securely retained in a bore or hole in a support structure that does not rely on or employ threaded screws or nail fasteners.

It is a still further object of embodiments of this invention to provide such mounting devices that can be economically and efficiently manufactured.

SUMMARY

Embodiments of the invention comprise mounting devices for affixing to holes or bores in supporting structures to anchor lines to the mounting devices and supporting structures. The mounting devices each include a wall mount member with a base having a front and a back surface and a hole passing through the base. An elongated wall mount member extends distally from the base back surface and includes a pair of flexible legs. A distally extending cavity is located between the legs and in communication with the hole passing through the base. Finally, a plurality of engagement members are located on the outer surfaces of the legs.

The wall mount member embodiments also each include a stirrup having a line receiving opening. This stirrup is attached to the wall mount member base front surface. The stirrup may have a laterally disposed free edge at its distal end spaced from the base front surface to define an entry gap through which a line may be moved into the stirrup line receiving opening. Also, the base front surface made have a laterally disposed rounded cavity opposite the entry gap to help retain a line in the stirrup.

Finally, a locking member is provided that includes a hook member at its proximal end. In embodiments the distal end of the hook member will extend past the distal free edge of the stirrup to at least partially close the stirrup line receiving opening when the locking member is pushed home in the wall mount member. The locking member also includes a distally extending shaft dimensioned to pass through the hole in the base and enter the distally extending cavity between the legs as the wall mount member is pushed home to engage the inner surfaces of the legs to bend them laterally and fix the mounting device in the hole or bore in the support structure. The locking member may be frangibly attached to the base front surface so that it can be removed just before use.

In embodiments the wall mount member may have a laterally disposed slot located in the outer surface of the stirrup adjacent the front base surface with a latch disposed at the distal edge of the stirrup that is positioned and dimensioned to enter the laterally disposed slot in the outer surface of the stirrup to lock the locking member to the base of the wall mount member.

In embodiments the hole in the base may have at least one keyway at its entry and the distally extending shaft may have at least one radially projecting longitudinal bead positioned and dimensioned to fit through the keyway to orient the stirrup in the wall mount member base. Preferably, at least four keyways and beads will be provided. The one or more keyways and one or more beads cooperate to orient the stirrup with respect to the base of the wall mount member.

DRAWINGS

Features, objects and advantages of embodiments may be best understood by reference to the following description, taken in connection with the following drawings, in which like reference numerals identify like elements in the several figures, and in which.

DESCRIPTION

Figure 1:
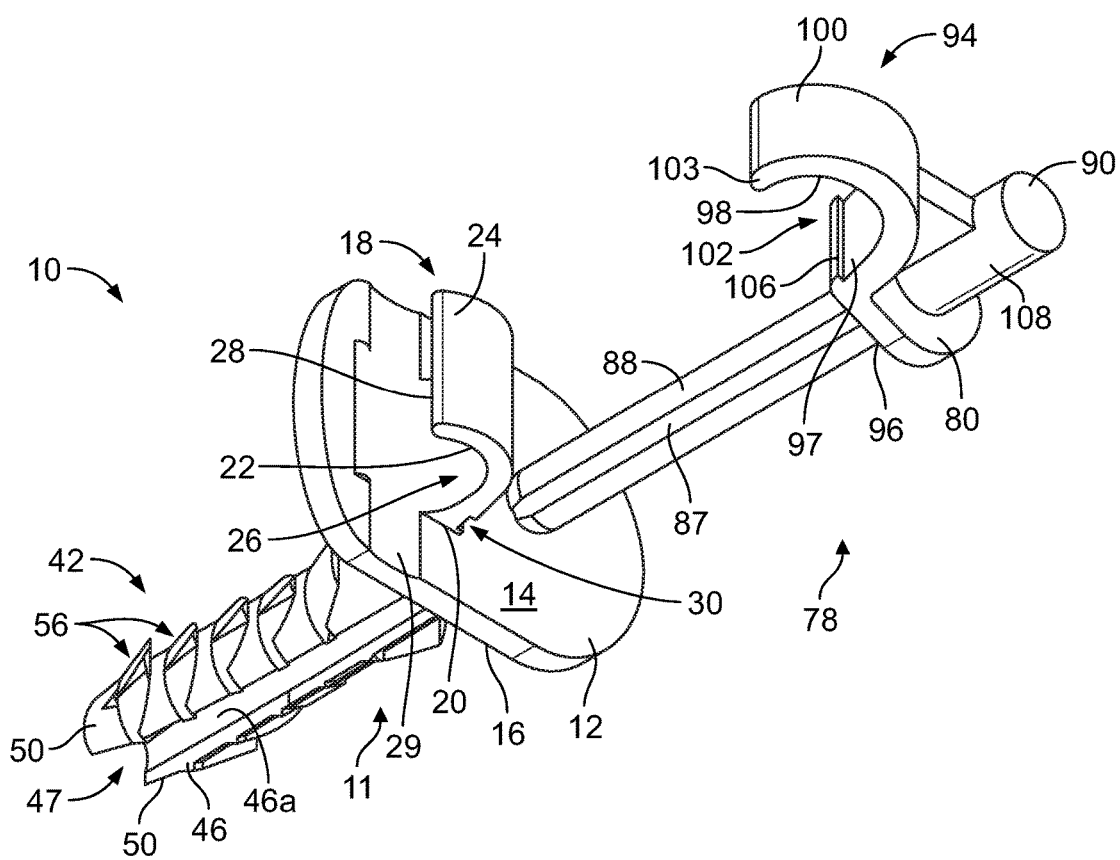
FIG. 1 is a perspective view of a mounting device in accordance with embodiments of the invention showing interconnected wall mount and locking members.
Figure 2:
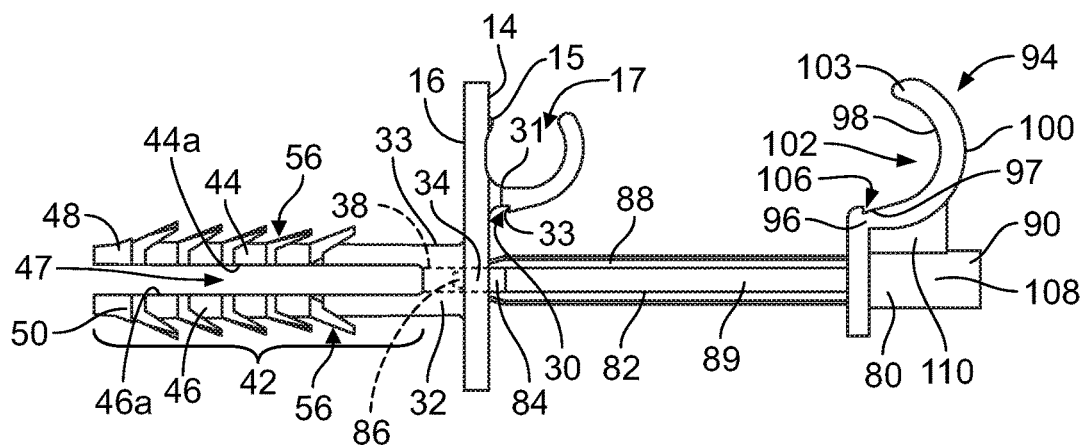
FIG. 2 is a front elevation view of the mounting device of FIG. 1.
Figure 4:
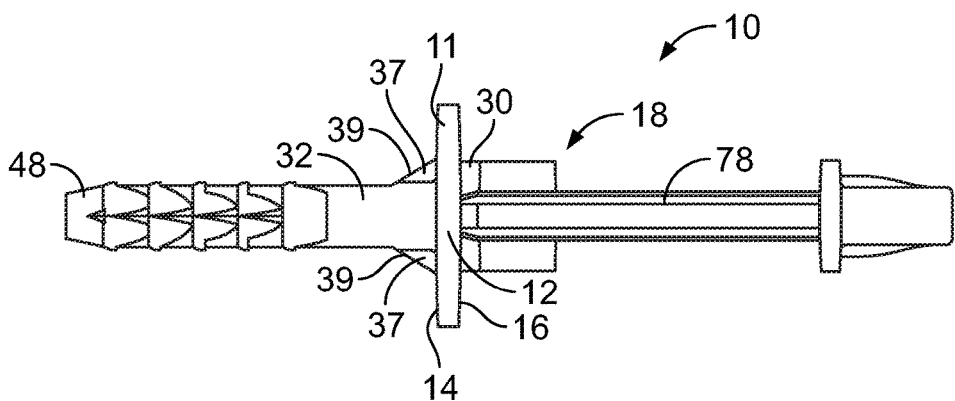
FIG. 4 is a bottom plan view of the mounting device of FIG. 1.

Turning first to FIGS. 1, 2 and 4, a mounting device 10 including a wall mount member 11 and a locking member 78 in accordance with embodiments of the invention is illustrated. The wall mount member and locking member may be molded in one piece from an appropriate plastic such as nylon, polyethylene, polyprylene, ABS, or polycarbonate. Wall mount member 11 includes a base 12 which may be elongated as shown with a front surface 14 and a back surface 16.

The base also has an open cable stirrup 18 which is attached at its base 20 to front surface 14 of the wall mount member base. Stirrup 18 has corresponding curved inner and outer surfaces 22 and 24 which extend at their proximal end from surface 14 to a laterally disposed free edge 28 at the distal end of the stirrup.

The curved inner surface of the stirrup defines a line or cable-receiving opening 26 and the spacing of its free edge 28 from surface 14 defines an entry gap 17 (FIG. 2) to the stirrup which approximates the diameter of a line to be mounted in the mounting device.

A laterally disposed slot 30 is formed in the outer surface of the stirrup adjacent front surface 14 of the wall mount member base. Front surface 14 defines the back edge of the slot. As best seen in FIG. 2, slot 30 additionally includes a slot landing 31 and an entry edge 33. A laterally disposed gently rounded slot 29 may be formed in the base front surface opposite the inner surface of the stirrup to help position a line in the stirrup. Additionally, a lateral ridge 15 may be formed on the front surface of the base opposite free edge 28 of the stirrup to further help retain the line.

Figure 3:
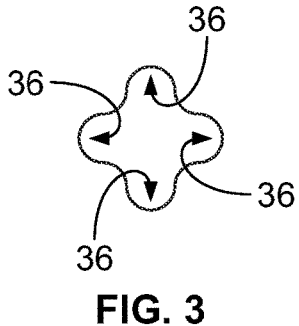
FIG. 3 is a diagrammatic representation of the keyways at the entry to the hole in the base of the wall mount member of the mounting device of FIG. 1.

Elongated wall mount member base 12 has a hole 34 (FIG. 2) and a hub 32 with a circular outer surface and a channel 38 which is aligned with hole 34 and extends distally from the back surface of the base. Hole 34 has keyways 36 at the entry to the hole as depicted in FIG. 3.

An elongated retention member 42 extends distally from the hub. The elongated retention member has first and second flexible legs 44 and 46 with inner surfaces 44a and 46a. These legs in turn have respective distal tips 48 with ramps 50 comprising curved outer guide surfaces which "ramp up" from the distal ends of the legs toward the wall mount member base. A distally extending cavity 47 is located between the inner surfaces of legs 44 and 46 in communication with channel 38. Inner surfaces 44a and 46a may be parallel to each other but preferably will angle away from each other to facilitate tool movement during the molding of the legs by making the open end of cavity 47 larger than its base adjacent channel 38.

Bore engagement members 56 are located on the outer surfaces of the legs. Preferably the bore engagement members will be present in aligned pairs on the outer surfaces of the legs. At least one pair of bore engagement members must be present and preferably there will be two or more pairs of bore engagement members.

Figure 2A:
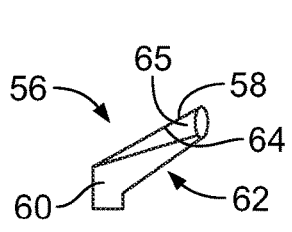
FIGS. 2A and 2B are partial elevation views of different bore engagement members of the wall mounted member of the mounting device of FIG. 1.
Figure 2B:
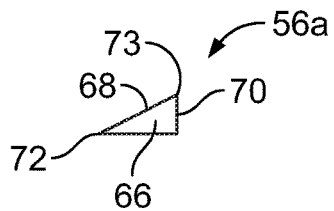

Different types of bore engagement members may be used. For example, as shown in FIG. 2A they may comprise distally directed spurs 58 having distal base portions 60, spur undercuts 62 and flexible proximal portions 64 with outer rounded surfaces 65. In another embodiment depicted in FIG. 2B, bore engagement members 56a may comprise wedges 66 with distally tapering rounded outer surfaces 68, proximal bases 70, distal ends 72, and a sharp edge 73 (FIGS. 5A and 5E) at the intersection of outer surfaces 68 and proximal bases 70.

Locking member 78 has a locking member base 80 and a shaft 82 that extends distally from the locking member base. A nipple 86 may be present at the distal end 84 of the shaft to help guide entry into base hole 34. Longitudinally extending slots 87 are evenly distributed about the radius of the shaft to define radially projecting longitudinal beads 88 (FIG. 1) and a circular longitudinally extending central portion 89 of the shaft (FIG. 2). Beads 88 are positioned and dimensioned to fit through keyways 36 to properly orient cable stirrup 18 with respect to the longitudinal axis of the wall mount member base, as will be described in more detail below. Circular central portion 89 of the shaft has a diameter corresponding to that of base channel 38 enabling the shaft to pass through the hub with the beads aligned with keyways 36.

A distally opening hook member 94 is located near the proximal end 90 of the shaft. Hook member 94 has a base 96, a curved inner surface 98, a curved outer surface 100, a distal opening 102, and a distal end 103. A ledge 106 is located at the bottom of opening 102, and intersects the distal edge 97 of the curved inner surface of the hook member. The hook member is designed to cooperate with stirrup 18 of the wall mount member of the mounting device so that curved inner surface 98 of the hook member corresponds generally to curved outer surface 24 of the stirrup. Most importantly, the distal end 103 of the hook member extends past the distal free edge 28 of the stirrup to at least partially close stirrup entry gap 17 so that it is narrower than the diameter of the cable. This enables the mounting device to resist removal of a cable positioned in the stirrup when the locking member is in its final closed position in the wall mount member of the mounting device.

A portion 108 of shaft 82 extends proximally beyond hook member base 96. A support wall 112 extending between the outer surface of the hook member and the proximal portion of the shaft may be present to brace hook member 94 lending it enhanced resistance to flexure and breakage. Bracing the hook member to give it enhance resistance to flexure helps ensure that cables mounted to the mounting device are securely held in place when the mounting device locking member is in its final closed position in the wall mount member of the mounting device.

Mounting device 10 may be molded in one piece, with shaft 82 of the locking member frangibly attached to front surface 14 of wall mount member 11. This is accomplished with an appropriately configured tool which forms nipple 86 at the distal end of the shaft during the molding process to leave a readily broken away or frangible plastic collar between the distal end of the shaft and front surface 14 of the base.

Figures 5A, 5B:
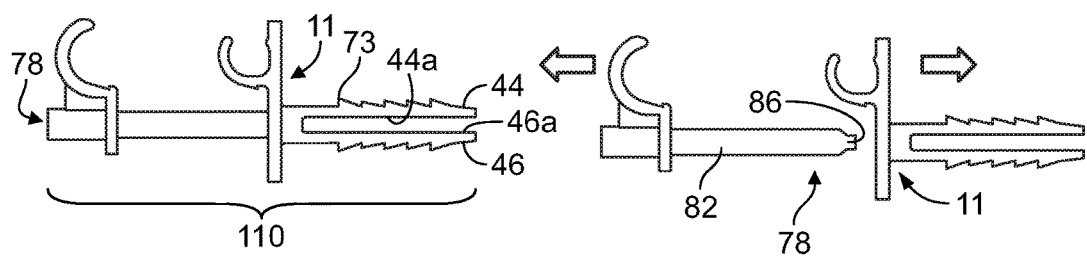
FIGS. 5A-5F are diagrammatic representations of steps in the process of attaching the mounting device of FIGS. 1, 2 and 4 to a solid wall.
Figure 5C:
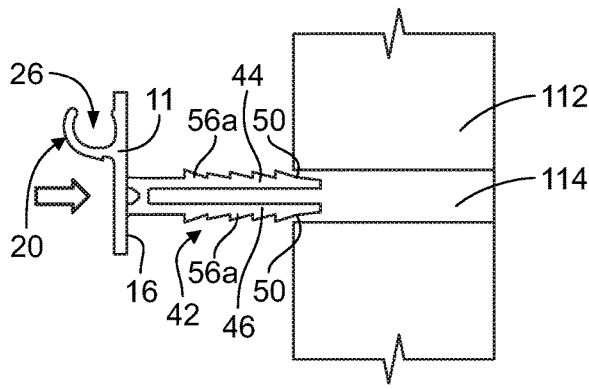

An exemplary application of mounting device 10 in attaching a cable to a wall is illustrated in FIGS. 5A-5F and described below. In this illustration, the mounting device is attached to a solid wall 112 in which a hole 114 slightly larger than the diameter of hub 32 of the wall mount member 11 of the device is bored at a location corresponding to where the a cable 114 is to be permanently positioned. The mounting device is chosen with opening 26 of stirrup 28 and hook member 98 dimensioned to correspond generally to the size of the cable and hook member 94 dimensioned to firmly engage the outer surface of the cable when the mounting device is mounted and closed:

1. A hole 114 is bored in a solid support wall 112 at an appropriate desired location as indicated in FIG. 5C to anchor a line such as a cable 116 (FIG. 5D) to the support wall.

2. Where the mounting device is molded as one unitary piece 110, as shown in FIG. 5A, locking member 78 can be parted from wall mount member 11 so that the base member and wall mount member are separate as shown in FIG. 5B.

3. The elongated retention member 42 of wall mount member 11 is inserted in the hole with ramps 50 at the distal tips of legs 44 and 46 facilitating the insertion process. The retention member is pressed or tapped home as shown in FIG. 5C by applying a force in the direction indicated by the arrow in this figure until back surface 16 of the base of the wall member contacts outer surface 118 of support wall 112. Preferably as legs 44 and 46 advance into the bore they will be compressed together toward cavity 47. Triangular portions 37 which extend between back surface 16 of base 12 and circular outer surface 33 of hub 32 (FIG. 4) preferably penetrate or bite into the outer surface of the wall to help resist rotation of the wall mount member.

The elongated wall mount member base is preferably positioned so that its longitudinal axis is vertical. As the legs pass through the hole, bore engagement members 56a comprising wedges 66 with sharp edges 73 move along the surface of the bore.

Figure 5D:
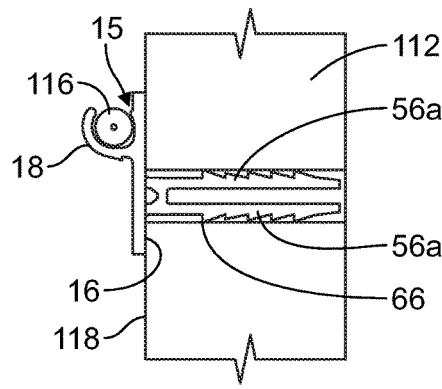

4. A portion of line or cable 116 is moved into open stirrup 18, as shown in FIG. 5D. The cable passes over lateral ridge 15 and into slot 29 on the front surface of the base which helps maintain the cable in place on the stirrup.

Figure 5E:
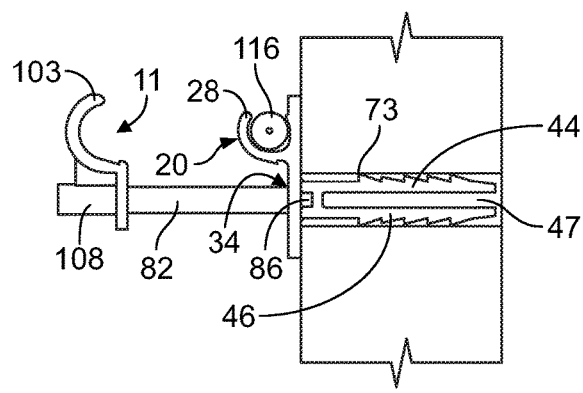

5. As shown in FIG. 5E, locking member 78 is now positioned with distal end 84 of its shaft 82 opposite hole 34 in the base. Nipple 86 (FIG. 5B) at the distal end of the shaft helps facilitate this positioning process.

Figure 5F:
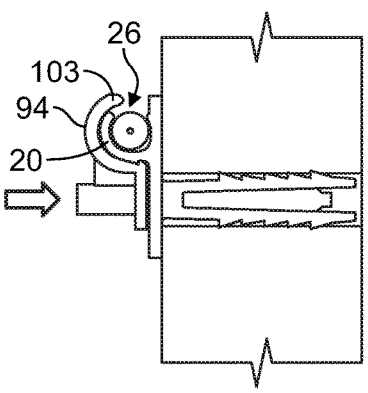

6. Turning now to FIGS. 5E and 5F and referencing FIGS. 2 and 3, shaft 82 is pushed or tapped into hole 34 with beads 88 riding in keyways 36 so that the shaft passes through channel 38 which extends from the hole in the base through hub 32. As the shaft moves distally, it enters cavity 47 between legs 44 and 46 with the shaft properly oriented with respect to elongated base 12.

7. The shaft is advanced to the final closed position illustrated in FIG. 5F, as it contacts leg inner surfaces 44a and 46a spreading the legs apart so that the sharp edges 73 of the bore engagement members are forced against the surface of the bore to firmly engage the bore surface and resist removal of the cable mounting device. Where, for example, the mounting device is mounted to a hollow wall, the sharp edges of the engagement member will firmly engage the edges of the hole in the outer member of the wall as well as its back surface. When the shaft nears the final closed position of FIG. 5F, ledge 106 enters slot 30 in the outer surface of the stirrup and distal end 103 of hook member 94 reaches beyond distal free edge 28 (FIG. 1) of the stirrup to partially obstruct receiving opening 26 of stirrup 20 to lock the cable in the now firmly mounted cable mounting device as illustrated in Figure F.

All references, including publications, patent applications, and patents, cited herein are hereby incorporated by reference to the same extent as if each reference were individually and specifically indicated to the incorporated by reference and were set forth in its entirety herein.

The use of the terms "a" and "an" and "the" and similar references in the context of describing embodiments (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable other unless otherwise indicated herein or otherwise clearly contradicted by context. The use of any and all examples, or exemplary language (i.e., "such as") provided herein, is intended merely to illuminate embodiments and does not pose a limitation on the scope of the embodiments unless otherwise claimed. No language in the specification should be construed as indicating any non-claimed element as essential to the practice of the embodiments.

Preferred embodiments are described herein, including the best mode known to the inventors for carrying them out. Variations of those preferred embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, embodiments include all modifications and equivalents of the subject matter recited in the claims appended hereto as permitted by applicable law. Moreover, any combination of the above-described elements in all possible variations thereof is encompassed embodiments unless otherwise indicated herein or otherwise clearly contradicted by context.

| | ELEMENTS IN FIGURES |
|---|---|
| 10 | Mounting device |
| 11 | Wall mount member |
| 12 | Elongated wall mount member base |
| 14 | Front surface of base |
| 15 | Lateral ridge on front surface of base |
| 16 | Back surface of base |
| 17 | Entry gap to stirrup |
| 18 | Open line stirrup |
| 20 | Base of stirrup |
| 22 | Curved inner surface of stirrup |
| 24 | Curved outer surface of stirrup |
| 26 | Cable or line receiving opening of stirrup |
| 28 | Distal free edge of stirrup |
| 29 | Laterally disposed slot in base front surface opposite inner surface of stirrup |
| 30 | Laterally extending slot in outer surface of stirrup |
| 31 | Slot landing |
| 32 | Hub extending distally from back surface of base |
| 33 | Entry edge of slot |
| 33 | Circular outer surface of hub |
| 34 | Hole in base |
| 35 | Proximal side |
| 36 | Keyway in hole |
| 37 | Triangular portions |
| 38 | Channel extending from hole in base through hub |
| 39 | Loading edge of triangular portions |
| 42 | Elongated retention member extending distally from hub |
| 44 | First leg of elongated retention member |
| 46 | Second leg of elongated retention member |
| 47 | Cavity between legs |
| 48 | Distal tips of legs |
| 50 | Distal ramps of legs |
| 52 | Curved outer guide surfaces of distal ramps |
| 54 | Distally extending cavity between legs and communication with channel |
| 56 | Bore engagement members extending laterally from first and second legs |
| 58 | Distally directed spur |
| 60 | Distal base portion of spur |
| 62 | Spur undercut |
| 64 | Flexible proximal portion of spur |
| 65 | Outer rounded surface of spur 56 |
| 66 | Wedge |
| 68 | Distally tapering outer surface of wedge |
| 70 | Proximal base of wedge |
| 72 | Distal end of wedge |

-continued

ELEMENTS IN FIGURES

| | |
|---|---|
| 73 | Edge at intersection of outer surfaces and bases of wedges |
| 78 | Locking member |
| 80 | Locking member base |
| 82 | Shaft of cable and locking member |
| 84 | Distal end of shaft |
| 86 | Nipple at distal end of shaft |
| 87 | Longitudinal dots in shaft |
| 88 | Radially projecting longitudinal beads |
| 89 | Circular central portion of shaft |
| 90 | Proximal portion of shaft |
| 94 | Distally opening hook member |
| 96 | Base of hook member |
| 97 | Distal edge of curved inner surface of hook member |
| 98 | Curved inner surface of hook member |
| 100 | Curved outer surface of hook member |
| 102 | Distal opening of hook member |
| 103 | Distal end of hook member |
| 106 | Ledge at intersection of hook member and proximal surface of locking member base |
| 108 | Proximal portion of shaft |
| 110 | One piece molded mounting device |
| 112 | Solid support wall |
| 114 | Hole in drywall panel |
| 116 | Cable |
| 118 | Outer surface of wall |

What is claimed is:

1. A mounting device for affixing to a bore extending into a support structure wall, the mounting device to anchor a line to the mounting device and the support structure wall, comprising:
    a wall mount member having a base with front and back surfaces and a hole with at least one keyway at the entry of the hole passing through the base;
    a hub extending distally from the base back surface of the wall mount member, the hub including a pair of flexible legs with a distally extending cavity between the legs in communication with the base hole;
    a stirrup having a line receiving distally directed opening attached to the front surface of the base of the wall mount member; and
    a locking member having a distally opening hook member at its proximal end and a distally extending shaft dimensioned to pass through the hole in the base and enter the distally extending cavity and engage the inner surfaces of the legs to bend the legs apart to engage the bore, with the distally extending shaft having at least one radially projecting longitudinal bead positioned and dimensioned to fit through the keyway to orient the stirrup in the wall mount base.

2. The mounting device of claim 1 in which the locking member is frangibly attached to the front surface of the base of the wall mount member.

3. The mounting device of claim 1 in which the stirrup has a laterally disposed free edge at its distal end spaced from the front surface of the base to define an entry gap through which the line may be moved into the stirrup line receiving opening.

4. The mounting device of claim 3 having a laterally disposed rounded cavity in the base front surface opposite the entry gap to help retain a line in the stirrup.

5. The mounting device of claim 1 in which a laterally disposed slot is located in the outer surface of the stirrup adjacent the front surface of the base, and the hook member has a base, a curved inner surface with a distal edge and a ledge at the distal edge positioned and dimensioned to enter the laterally disposed slot in the outer surface of the stirrup to lock the locking member to the base of the wall mount member.

6. The mounting device of claim 1 in which the line is chosen from the group consisting of cables, ropes, strings, cords, wires, hooks, eyelets and rings.

7. The mounting device of claim 1 including two or more keyways and two or more radially projecting longitudinal beads positioned and dimensioned to fit through the keyways.

8. The mounting device of claim 1 in which the base is elongated and the keyway and bead cooperate to orient the stirrup with respect to the longitudinal axis of the base.

9. The mounting device of claim 1 in which the legs have distal tips and the distal tips of the legs have ramped outer guide surfaces.

10. The mounting device of claim 1 in which bore engagement members are located on the outer surfaces of the legs for engaging a surface of the bore.

11. The mounting device of claim 10 in which the bore engagement members comprise distally directed spurs for engaging the surface of the bore.

12. The mounting device of claim 10 in which the bore engagement members comprise wedges with sharp edges for engaging the surface of the bore.

13. The mounting device of claim 1 including a nipple at a distal end of the shaft of the locking member for facilitating entry of the shaft through the hole in the base of the wall mount member.

14. The mounting device of claim 1 in which the hook member and stirrup have respective curved inner and outer surfaces and the curved inner surface of the hook member corresponds generally to the curved outer surface of the stirrup.

15. The mounting device of claim 1 in which a distal end of the hook member extends past the distal free edge of the stirrup to at least partially close the line receiving opening.

16. The mounting device of claim 1 in which a support wall is positioned between the outer surface of the hook member and the proximal end of the shaft to brace the hook member and resist flexure and breakage.

17. A method of anchoring a line to a support structure wall comprising:
    providing a mounting device including a wall mount portion having a base with front and back surfaces and a hole passing through the base, a hub extending distally from the back surface of the base, with an elongated retention member including a pair of flexible legs and a distally extending cavity between the legs in communication with the hole of the base, and a plurality of engagement members on the outer surfaces of the legs, a stirrup having a line receiving opening attached to the front surface of the base and a laterally disposed slot located in the outer surface of the stirrup adjacent the base of the wall mount member, and a locking member having a distally opening hook member with a ledge located at a distal edge of the hook member at its proximal end and a distally extending shaft dimensioned to pass through the hole in the base and enter the distally extending cavity and engage the inner surfaces of the legs to bend the legs laterally;
    providing a bore in the support structure wall;
    inserting the elongated retention member of the wall mount member in the support wall bore until the back surface of the base of the wall mount member contacts an outer surface of the support wall;
    moving a portion of the line into the stirrup;

positioning the distal end of the shaft of the locking member opposite the hole in the base of the wall mount member and pushing the shaft into the hole so that the shaft passes through the cavity between the legs contacting the leg inner surfaces spreading the legs apart so that the engagement members on the outer surfaces of the legs are forced against a surface of the bore, the ledge enters the laterally disposed slot to lock the locking member to the base of the wall mount member, and a distal end of the hook member extends past the distal free edge of the stirrup to at least partially close the line receiving opening to capture the line in the stirrup.

18. A mounting device for affixing to a hole or bore in a support structure, the mounting device to anchor a line to the mounting device and support structure, comprising:
   a wall mount member having a base with front and back surfaces and a hole passing through the base;
   a hub extending distally from the back surface of the base of the wall mount member, the hub including a pair of flexible legs with distal tips and a distally extending cavity between the legs in communication with the hole of the base;
   a stirrup having a line receiving opening attached to the front surface of the base of the wall mount member;
   a locking member having a hook member at its proximal end and a distally extending shaft dimensioned to pass through the hole in the base and enter the distally extending cavity and engage the inner surfaces of the legs to bend the legs apart;
   a laterally disposed slot located in the outer surface of the stirrup adjacent the front surface of the base; and
   the hook member has a base, a curved inner surface with a distal edge and a ledge at the distal edge positioned and dimensioned to enter the laterally disposed slot in the outer surface of the stirrup to lock the locking member to the base of the wall mount member.

19. The mounting device of claim 18 in which the locking member is frangibly attached to the front surface of the base of the wall mount member.

20. The mounting device of claim 18 in which the stirrup has a laterally disposed free edge at its distal end spaced from the front surface of the base to define an entry gap through which the line may be moved into the stirrup line receiving opening.

21. The mounting device of claim 20 having a laterally disposed rounded cavity in the front surface of the base opposite the entry gap to help retain the line in the stirrup.

22. The mounting device of claim 18 in which the hole in the base has at least one keyway at the entry of the hole and the distally extending shaft has at least one radially projecting longitudinal bead positioned and dimensioned to fit through the keyway to orient the stirrup in the base of the wall mount member.

23. The mounting device of claim 22 in which the base is elongated and the keyway and bead cooperate to orient the stirrup with respect to the longitudinal axis of the base.

24. The mounting device of claim 18 in which the bore engagement members are located on outer surfaces of the legs for engaging a surface of the hole or bore and comprise distally directed spurs for engaging the surface of the hole or bore.

25. The mounting device of claim 18 in which the bore engagement members are located on outer surfaces of the legs for engaging a surface of the hole or bore and comprise wedges with sharp edges for engaging the surface of the hole or bore.

26. The mounting device of claim 18 in which the hook member and stirrup have respective curved inner and outer surfaces and the curved inner surface of the hook member corresponds generally to the curved outer surface of the stirrup.

27. The mounting device of claim 18 in which a distal end of the hook member extends past a distal free edge of the stirrup to at least partially close the stirrup line receiving opening.

28. A method of anchoring a line to a support wall structure comprising:
   providing a mounting device including a wall mount portion having a base with front and back surfaces and a hole passing through the base, a hub extending distally from the back surface of the base, with an elongated retention member including a pair of flexible legs and a distally extending cavity between the legs in communication with the hole of the base, and a plurality of engagement members on the outer surfaces of the legs, a stirrup having a line receiving opening attached to the front surface of the base, and a locking member having a hook member at its proximal end and a distally extending shaft dimensioned to pass through the hole in the base and enter the distally extending cavity and engage the inner surfaces of the legs to bend the legs laterally;
   providing a hole in a support wall;
   inserting the elongated retention member of the wall mount member in the support wall hole until the back surface of the base of the wall mount member contacts the outer surface of the hole of the support wall;
   moving a portion of the line into the stirrup;
   positioning a distal end of the shaft of the locking member opposite the hole in the base of the wall mount member and pushing the shaft into the hole so that the shaft passes through the cavity between the legs contacting the leg inner surfaces spreading the legs apart so that the engagement members on the outer surfaces of the legs are forced against the surface of the hole and the distal end of the hook member extends past a distal free edge of the stirrup to at least partially close the stirrup line receiving opening to capture the line in the stirrup; and
   providing a laterally disposed slot in the outer surface of the stirrup adjacent the base of the wall mount member and a ledge at a distal edge of the hook member, and pushing the shaft into the hole in the base of the wall mount member until the ledge enters the laterally disposed slot to lock the locking member to the base of the wall mount member.

* * * * *